United States Patent
Kawabata

(10) Patent No.: US 12,185,440 B2
(45) Date of Patent: Dec. 31, 2024

(54) AUTOMOTIVE LAMP SYSTEM

(71) Applicant: KOITO MANUFACTURING CO., LTD., Tokyo (JP)

(72) Inventor: Naoki Kawabata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 181 days.

(21) Appl. No.: 17/951,491

(22) Filed: Sep. 23, 2022

(65) Prior Publication Data
US 2023/0013166 A1 Jan. 19, 2023

Related U.S. Application Data

(63) Continuation of application No. PCT/JP2021/012563, filed on Mar. 25, 2021.

(30) Foreign Application Priority Data

Mar. 26, 2020 (JP) .................................. 2020-056627
Mar. 26, 2020 (JP) .................................. 2020-056628

(51) Int. Cl.
*H05B 47/105* (2020.01)
*B60Q 1/08* (2006.01)
(Continued)

(52) U.S. Cl.
CPC ............. *H05B 47/105* (2020.01); *B60Q 1/08* (2013.01); *F21S 41/143* (2018.01); *H05B 45/325* (2020.01); *F21W 2102/14* (2018.01)

(58) Field of Classification Search
CPC ... H05B 47/105; H05B 45/325; F21S 41/143; B60Q 1/08; F21W 2102/14
See application file for complete search history.

(56) References Cited

U.S. PATENT DOCUMENTS

2009/0033644 A1 2/2009 Kawaguchi et al.

FOREIGN PATENT DOCUMENTS

| JP | H0818341 A | 1/1996 |
| JP | 2018172038 A | 11/2018 |

(Continued)

OTHER PUBLICATIONS

English machine translation of KR 10-2010-0114609 (Year: 2010).*

(Continued)

*Primary Examiner* — Anne M Hines
(74) *Attorney, Agent, or Firm* — Buchanan Ingersoll & Rooney PC

(57) ABSTRACT

A controller pulse width modulation (PWM) controls multiple light-emitting pixels arranged in an array that form a variable light distribution lamp. A common counter is provided in common for the multiple light-emitting pixels, and generates a common count value having a ramp waveform. A signal processing unit generates multiple duty cycle instruction values for specifying the duty cycles of the multiple light-emitting pixels according to a light distribution instruction. Furthermore, the signal processing unit stores multiple offset values that correspond to the multiple light-emitting pixels, generates an individual count value for each light-emitting pixel by adding the corresponding offset value to the common count value, and generates individual PWM signals pwm1 through pwmn that correspond to results of comparison between the individual count values and the corresponding duty cycle instruction values.

23 Claims, 12 Drawing Sheets

(51) Int. Cl.
    *F21S 41/143*     (2018.01)
    *H05B 45/325*     (2020.01)
    *F21W 102/14*     (2018.01)

(56)     References Cited

FOREIGN PATENT DOCUMENTS

| | | |
|---|---|---|
| JP | 2019213349 A | 12/2019 |
| KR | 20100114609 A | 10/2010 |

OTHER PUBLICATIONS

International Preliminary Report on Patentability Chapter I (PCT/IB/373) mailed on Sep. 22, 2022, and Written Opinion (PCT/ISA/237) with translation mailed on May 18, 2021, by The International Bureau of WIPO in corresponding International Patent Application No. PCT/JP2021/012563. (10 pages).
International Search Report (PCT/ISA/210) with translation mailed on May 18, 2021, by the Japan Patent Office as the International Searching Authority for International Application No. PCT/JP2021/012563. (4 pages).
Extended European Search Report dated Sep. 7, 2023, issued in corresponding European Application No. 21775320.1. (14 pages).

\* cited by examiner

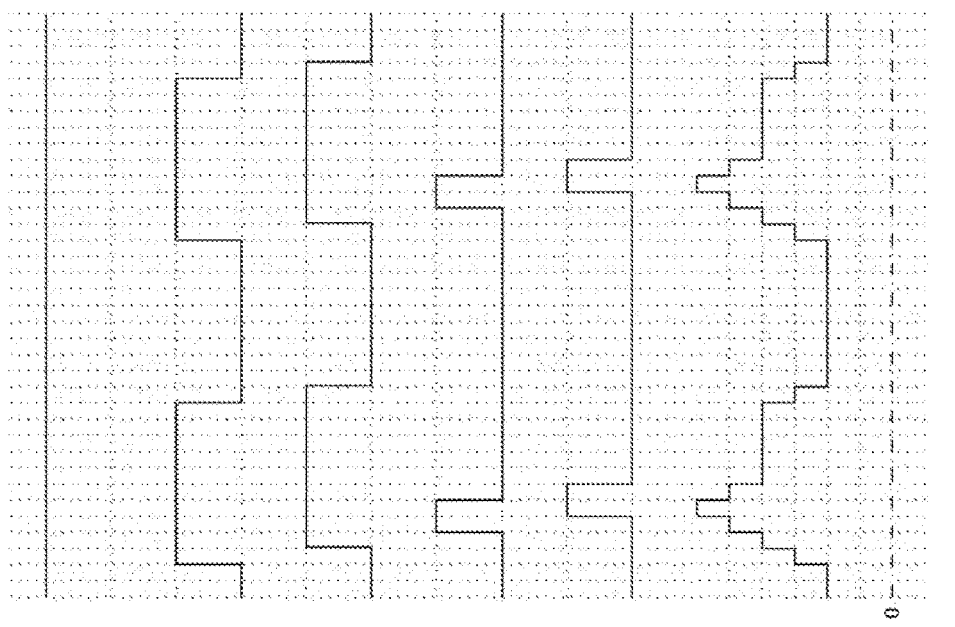
FIG. 10A EXAMPLE 1
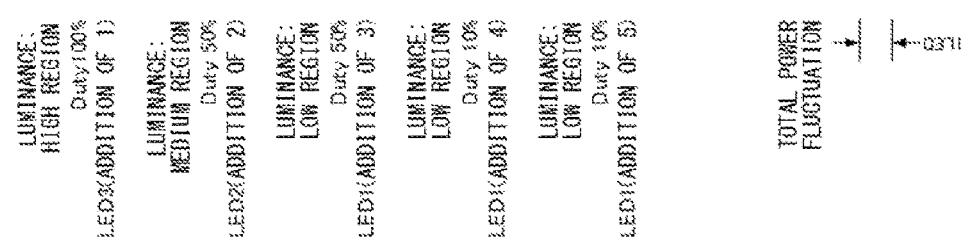
FIG. 10B COMPARISON EXAMPLE
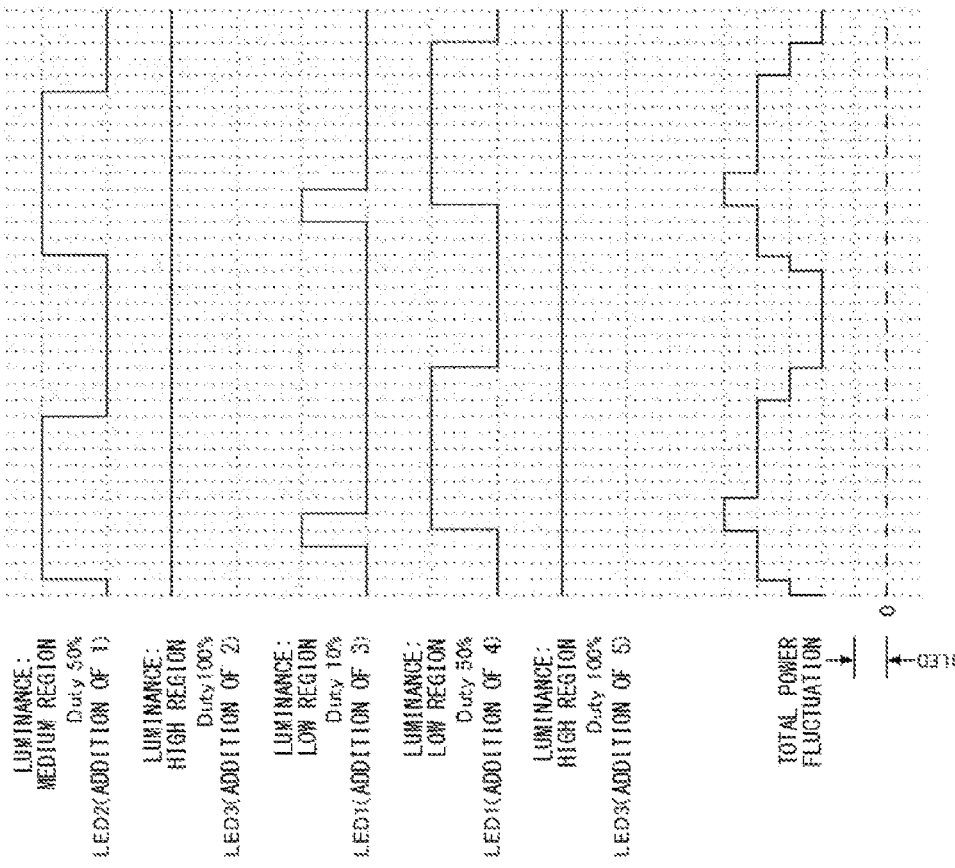

LOW-BEAM LIGHT DISTRIBUTION

FIG. 12

| | LUMINANCE | ADDITION VALUE |
|---|---|---|
| PIX1 | HIGH | 0 |
| PIX2 | VERY LOW | 1 |
| PIX3 | MEDIUM | 2 |
| PIX4 | VERY LOW | 3 |
| PIX5 | HIGH | 4 |
| PIX6 | VERY LOW | 5 |
| PIX7 | MEDIUM | 6 |
| PIX8 | VERY LOW | 7 |
| .... | .... | .... |

AUTOMOTIVE LAMP SYSTEM

BACKGROUND

1. Technical Field

The present disclosure relates to an automotive lamp.

2. Description of the Related Art

Typical automotive lamps are capable of switching between a low-beam mode and a high-beam mode. The low-beam mode is used to illuminate a close range in the vicinity of the user's vehicle with a predetermined light intensity. In the low-beam mode, light distribution is determined so as to prevent glare being imparted to an oncoming vehicle or a leading vehicle. The low-beam mode is mainly used when the vehicle is traveling in an urban area. In contrast, the high-beam mode is used to illuminate a distant range over a wide area ahead of the vehicle with a relatively high light intensity. The high-beam mode is mainly used when the vehicle is traveling at high speed along a road where there are a small number of oncoming vehicles and leading vehicles. Accordingly, the high-beam mode provides the driver with high visibility, which is an advantage, as compared with the low-beam mode. However, the high-beam mode has a problem of imparting glare to a pedestrian or a driver of a vehicle ahead of the vehicle.

In recent years, the Adaptive Driving Beam (ADB) technique has been proposed in which a high-beam light distribution pattern is dynamically and adaptively controlled based on the state of the surroundings of a vehicle. With the ADB technique, the presence or absence of a leading vehicle, an oncoming vehicle, or a pedestrian ahead of the vehicle is detected, and illumination is reduced or turned off for a region that corresponds to such a vehicle or pedestrian thus detected, thereby reducing glare imparted to such a vehicle or pedestrian.

As an ADB lamp, light-emitting diode (LED) array ADB lamp has been proposed. FIG. 1 is a block diagram showing such an LED array ADB lamp. An ADB lamp 1 includes an LED array 10, a light distribution controller 20, and a power supply circuit 30. The LED array 10 includes multiple LEDs 12 arranged in an array and an LED driver 14 that drives the multiple LEDs 12. Each LED 12 corresponds to a pixel. The LED driver 14 includes current sources (switches) each of which is assigned to the corresponding pixel. The LED driver 14 controls the on/off state of each current source so as to switch the on/off state of the corresponding pixel.

The power supply circuit 30 supplies a power supply voltage VDD to the LED array 10. The light distribution controller 20 generates a control signal for instructing the multiple pixels to turn on or off, and transmits the control signal to the LED array 10. The output beam of the LED array 10 is irradiated to a virtual vertical screen 40 via an unshown optical system. A light distribution pattern 42 that corresponds to the on/off states of the multiple light-emitting elements 12 is formed on the virtual vertical screen 40.

As a result of investigating the ADB lamp 1 shown in FIG. 1, the present inventor has come to recognize the following problem. FIG. 2 is a diagram for explaining a PWM operation of the ADB lamp 1 shown in FIG. 1. FIG. 2 shows the on/off states of the multiple pixels.

The light distribution controller 20 controls the on/off ratio (duty cycle) in the PWM period Tp for each LED 12. FIG. 2 shows a case in which all the LEDs are PWM-controlled in the same phase. In this case, at the start of the PWM period Tp, the multiple current sources are turned on at the same time, thereby turning on the multiple LEDs at the same time.

That is to say, at the start of the PWM period Tp, the load of the power supply circuit 30 suddenly becomes heavy. In other words, the power supply circuit 30 is required to be designed to be capable of handling a sudden increase in the load current $I_{OUT}$ at the start of the PWM period Tp. Specifically, the power supply circuit 30 requires a large current supply capacity and favorable load regulation characteristics.

SUMMARY

The present disclosure has been made in order to solve such a problem. Accordingly, it is an exemplary purpose of an embodiment of the present disclosure to relax the design specifications required for a power supply circuit configured to supply electric power to multiple light-emitting elements.

A controller according to an embodiment is structured to pulse width modulation (PWM) control multiple light-emitting pixels in an array that form a variable light distribution lamp. The controller includes: a common counter provided in common for the multiple light-emitting pixels, and structured to generate a common count value having a ramp waveform; and a signal processing unit structured to generate multiple duty cycle instruction values for specifying duty cycles for the multiple light-emitting pixels according to a light distribution instruction, to store multiple offset values that correspond to the multiple light-emitting pixels, to generate an individual count value for each light-emitting pixel by adding a corresponding offset value to the common count value, and to generate an individual PWM signal according to a result of a comparison between the individual count value and the corresponding duty cycle instruction value.

A controller according to an embodiment is structured to pulse width modulation (PWM) control multiple light-emitting pixels in an array that form a variable light distribution lamp. The controller includes a signal processing unit structured to generate multiple individual PWM signals that correspond to the multiple light-emitting pixels according to a light distribution instruction. The signal processing unit is structured to change a combination of the phases of the multiple individual PWM signals adaptively according to a light distribution.

It should be noted that any combination of the components described above or any component or any manifestation of the present disclosure may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 10A is a diagram showing an example of the phase control data that corresponds to the light distribution shown in FIG. 9, and FIG. 10B shows a comparison example in a case in which the light distribution shown in FIG. 9 is controlled using different phase control data;

FIG. 12 is a diagram showing an example of the phase control data that corresponds to the light distribution shown in FIG. 11.

DETAILED DESCRIPTION

Outline of Embodiments

Figure 1:
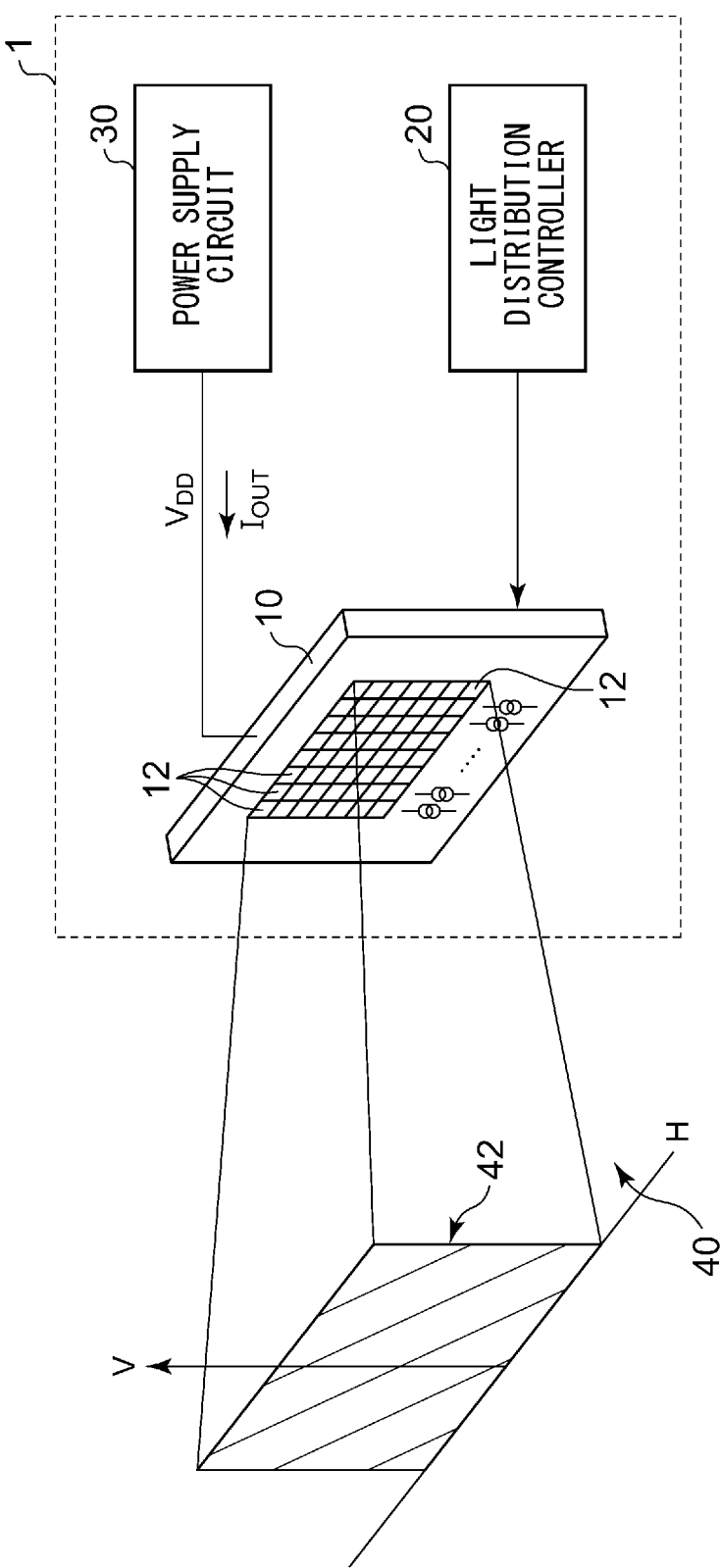
FIG. 1 is a block diagram showing an ADB lamp using an LED array method.
Figure 2:
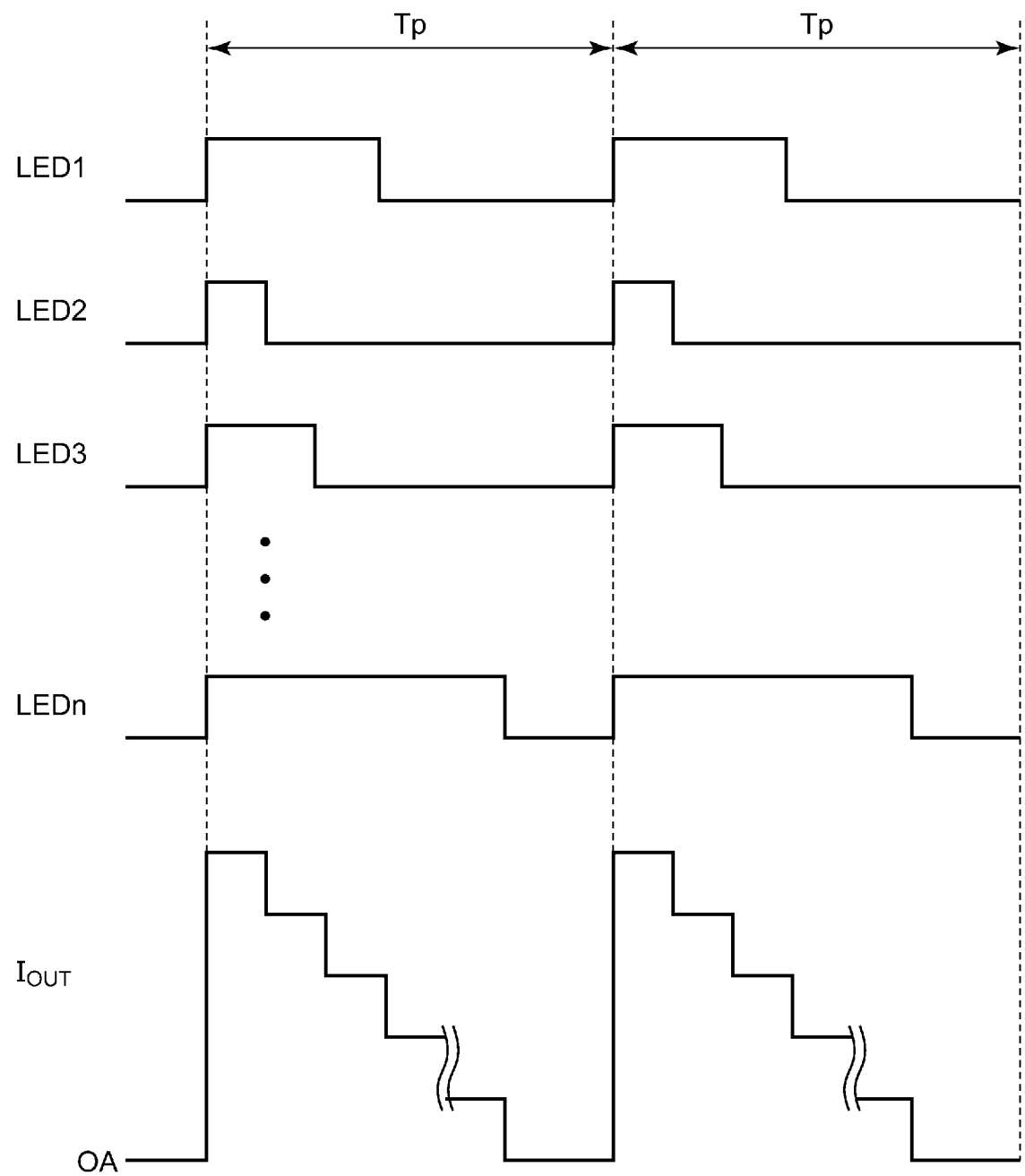
FIG. 2 is a diagram for explaining a PWM operation of the ADB lamp shown in FIG. 1.

Description will be made regarding the outline of several exemplary embodiments of the present disclosure. The outline is a simplified explanation regarding several concepts of one or multiple embodiments as a prelude to the detailed description described later in order to provide a basic understanding of the embodiments. That is to say, the outline described below is by no means intended to restrict the scope of the present invention and the present disclosure. Furthermore, the outline described below is by no means a comprehensive outline of all the possible embodiments. That is to say, the outline described below by no means restricts essential components of the embodiments. For convenience, in some cases, an "embodiment" as used in the present specification represents a single or multiple embodiments (examples and modifications) disclosed in the present specification.

This outline is by no means an comprehensive outline of all conceivable embodiments. That is to say, the outline is by no means intended to identify the indispensable or essential elements of all the embodiments, and is by no means intended to define the scope of a part of or all the embodiments. The sole purpose of the outline to is to present several concepts of one or multiple embodiments in a simple form as a prelude to the detailed description described later.

1. A controller according to one embodiment is structured to pulse width modulation (PWM) control multiple light-emitting pixels in an array that form a variable light distribution lamp. The controller includes a common counter and a signal processing unit. The common counter is provided in common for the multiple light-emitting pixels, and structured to generate a common count value having a ramp waveform. The signal processing unit generates multiple duty cycle instruction values for specifying duty cycles for the multiple light-emitting pixels according to a light distribution instruction. The signal processing unit stores multiple offset values that correspond to the multiple light-emitting pixels, and generates an individual count value for each light-emitting pixel by adding a corresponding offset value to the common count value, and generates an individual PWM signal according to a result of a comparison between the individual count value and the corresponding duty cycle instruction value.

With such an arrangement, this allows the phase of each individual PWM signal to be shifted according to the offset value. Such an arrangement is capable of setting the timings at which the multiple light-emitting pixels are turned on as desired. With this, the current that flows through the multiple light-emitting pixels can be smoothed, thereby suppressing the current peak, and thereby allowing the required capacity of the power supply circuit to be reduced. This can facilitate the design of the power supply circuit. Also, this can provide advantages of allowing the power supply circuit to be provided with a reduced cost, a compact size, etc.

In one embodiment, the signal processing unit may include multiple adders that correspond to multiple light-emitting pixels. Also, each adder may add a corresponding offset value to the common count value so as to output the individual count value. It should be noted that the term "addition" as used in the present specification includes "substruction".

In one embodiment, the signal processing unit may include a processor that is capable of executing a software program. Also, the controller may be provided by a combination of the software program and the processor.

In one embodiment, the signal processing unit may be structured to store multiple items of phase control data including the multiple offset values, and to select one item that corresponds to the light distribution instruction from among the multiple items of phase control data. With this, in various kinds of light distributions, this arrangement is capable of optimizing the lighting-on timings, i.e., the lighting-on periods, of the multiple light-emitting pixels. This allows the current peak to be suppressed more effectively.

In one embodiment, first data that is one item of the multiple items of phase control data may be determined such that, in a case in which the multiple light-emitting pixels are divided into ranks according to luminance, the multiple individual PWM signals that correspond to the multiple light-emitting pixels included in the same rank have substantially dispersed phases. With this, the current can be further smoothed.

In one embodiment, second data that is one item of the multiple items of phase control data may be determined such that the phases of k individual PWM signals that correspond to k multiple (k<n) light-emitting pixels included in a center region from among the n multiple light-emitting pixels are dispersed, and such that the phases of l individual PWM signals that correspond to l multiple (l<n) light-emitting pixels included in an outer-circumferential region from among the n multiple light-emitting pixels are dispersed. The second data can be effectively used for providing the high-beam light distribution.

In one embodiment, third data that is one item of the multiple items of phase control data may be determined such that the phases of k individual PWM signals that correspond to k multiple (k<n) light-emitting pixels included in a center-most region from among the n multiple light-emitting pixels are dispersed, such that the phases of l individual PWM signals that correspond to l multiple (l<n) light-emitting pixels included in an outer-most region from among the n multiple light-emitting pixels are dispersed, and such that the phases of m individual PWM signals that correspond to m multiple (m<n) light-emitting pixels included in a region interposed between the center-most region and the outer-most region are dispersed. The third data can be effectively used for providing the high-beam light distribution.

In one embodiment, fourth data that is one item of the multiple items of phase control data may be determined such that, in a case in which the multiple n light-emitting pixels are divided into ranks according to luminance, the phases of the individual PWM signals that correspond to the light-emitting pixels included in the multiple ranks are changed in a cyclic manner.

In one embodiment, fifth data that is one item of the multiple items of phase control data may be determined such that, in a case in which the multiple light-emitting pixels are divided into a first region defined on a lower side of a cutoff line of a low beam and a second region defined on an upper side of the cutoff line, the phases of the individual PWM signals that correspond to the light-emitting pixels included in the first region and the second region are changed in a cyclic manner. The fifth data can be effectively used for providing the high-beam light distribution.

In one embodiment, sixth data that is one item of the multiple items of phase control data may be determined such that the multiple individual PWM signals have equal phases.

In one embodiment, the variable light distribution lamp may form an active sensor together with an image sensor. Also, the sixth data may be selected in an image capture cycle of the image sensor. This is capable of preventing the occurrence of an artifact pattern in the image captured by the image sensor.

In one embodiment, seventh data that is one item of the multiple items of phase control data may be determined such that the phases of the multiple individual PWM signals that correspond to the multiple light-emitting pixels are an arithmetic progression.

A controller according to one embodiment is structured to pulse width modulation (PWM) control multiple light-emitting pixels in an array that form a variable light distribution lamp. The controller includes a signal processing unit structured to generate multiple individual PWM signals that correspond to the multiple light-emitting pixels according to a light distribution instruction. The signal processing unit is structured to change a combination of the phases of the multiple individual PWM signals adaptively according to a light distribution.

With this, in various kinds of light distributions, this arrangement is capable of optimizing the lighting-on timings, i.e., the lighting-on periods, of the multiple light-emitting pixels. This allows the current peak to be suppressed more effectively.

In one embodiment, the signal processing unit may store multiple items of phase control data each determining a combination of the phases of the multiple individual PWM signals. Also, the signal processing unit may select one from among the multiple items of phase control data according to the light distribution instruction. In many cases, an automotive lamp supports the use of several predetermined light distribution patterns. Accordingly, the phase control data may be prepared for each light distribution (i.e., for each combination of the duty cycles of the respective pixels), and the phase control data to be used may be switched according to the light distribution.

In one embodiment, first data that is one item of the multiple items of phase control data may be determined such that, in a case in which the multiple light-emitting pixels are divided into ranks according to luminance, the multiple individual PWM signals that correspond to the multiple light-emitting pixels included in the same rank have substantially dispersed phases. With this, the current can be further smoothed.

In one embodiment, second data that is one item of the multiple items of phase control data may be determined such that the phases of k individual PWM signals that correspond to k multiple (k<n) light-emitting pixels included in a center region from among the n multiple light-emitting pixels are dispersed, and such that the phases of l individual PWM signals that correspond to l multiple (l<n) light-emitting pixels included in an outer-circumferential region from among the n multiple light-emitting pixels are dispersed. The second data can be effectively used for providing the high-beam light distribution.

In one embodiment, third data that is one item of the multiple items of phase control data may be determined such that the phases of k individual PWM signals that correspond to k multiple (k<n) light-emitting pixels included in a center-most region from among the n multiple light-emitting pixels are dispersed, such that the phases of l individual PWM signals that correspond to l multiple (l<n) light-emitting pixels included in an outer-most region from among the n multiple light-emitting pixels are dispersed, and such that the phases of m individual PWM signals that correspond to m multiple (m<n) light-emitting pixels included in a region interposed between the center-most region and the outer-most region are dispersed. The third data can be effectively used for providing the high-beam light distribution.

In one embodiment, fourth data that is one item of the multiple items of phase control data may be determined such that, in a case in which the multiple n light-emitting pixels are divided into ranks according to luminance, the phases of the individual PWM signals that correspond to the light-emitting pixels included in the multiple ranks are changed in a cyclic manner.

In one embodiment, fifth data that is one item of the multiple items of phase control data may be determined such that, in a case in which the multiple light-emitting pixels are divided into a first region defined on a lower side of a cutoff line of a low beam and a second region defined on an upper side of the cutoff line, the phases of the individual PWM signals that correspond to the light-emitting pixels included in the first region and the second region are changed in a cyclic manner. The fifth data can be effectively used for providing the low-beam light distribution.

In one embodiment, sixth data that is one item of the multiple items of phase control data may be determined such that the multiple individual PWM signals have equal phases.

In one embodiment, the variable light distribution lamp may form an active sensor together with an image sensor. Also, the sixth data may be selected in an image capture cycle of the image sensor. This is capable of preventing the occurrence of an artifact pattern in the image captured by the image sensor.

In one embodiment, seventh data that is one item of the multiple items of phase control data may be determined such that the phases of the plurality of individual PWM signals that correspond to the multiple light-emitting pixels are an arithmetic progression.

In one embodiment, the controller may include a common counter and a signal processing unit. The common counter is provided in common for the multiple light-emitting pixels, and structured to generate a common count value having a ramp waveform. The signal processing unit generates multiple duty cycle instruction values for specifying duty cycles for the multiple light-emitting pixels. The signal processing unit stores multiple offset values that correspond to the multiple light-emitting pixels, and generates an individual count value for each light-emitting pixel by adding a corresponding offset value to the common count value, and generates an individual PWM signal according to a result of a comparison between the individual count value and the corresponding duty cycle instruction value.

With such an arrangement, this allows the phase of each individual PWM signal to be shifted according to the offset value. Such an arrangement is capable of setting the timings at which the multiple light-emitting pixels are turned on as desired. With this, the current that flows through the multiple light-emitting pixels can be smoothed, thereby suppressing the current peak, and thereby allowing the required capacity of the power supply circuit to be reduced. This can facilitate the design of the power supply circuit. Also, this can provide advantages of allowing the power supply circuit to be provided with a reduced cost, a compact size, etc.

In one embodiment, the signal processing unit may include multiple adders that correspond to multiple light-emitting pixels. Also, each adder may add a corresponding offset value to the common count value so as to output the individual count value. It should be noted that the term "addition" as used in the present specification includes "substruction".

In one embodiment, the signal processing unit may include a processor that is capable of executing a software program. Also, the controller may be provided by a combination of the software program and the processor.

In one embodiment, the signal processing unit may be structured to store multiple sets of offset values, and to select one set that corresponds to the light distribution instruction from among the multiple sets. With this, in various kinds of light distributions, this arrangement is capable of optimizing the lighting-on timings, i.e., the lighting-on periods, of the multiple light-emitting pixels. This allows the current peak to be suppressed more effectively.

Embodiments

Description will be made below regarding preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

Figure 3:
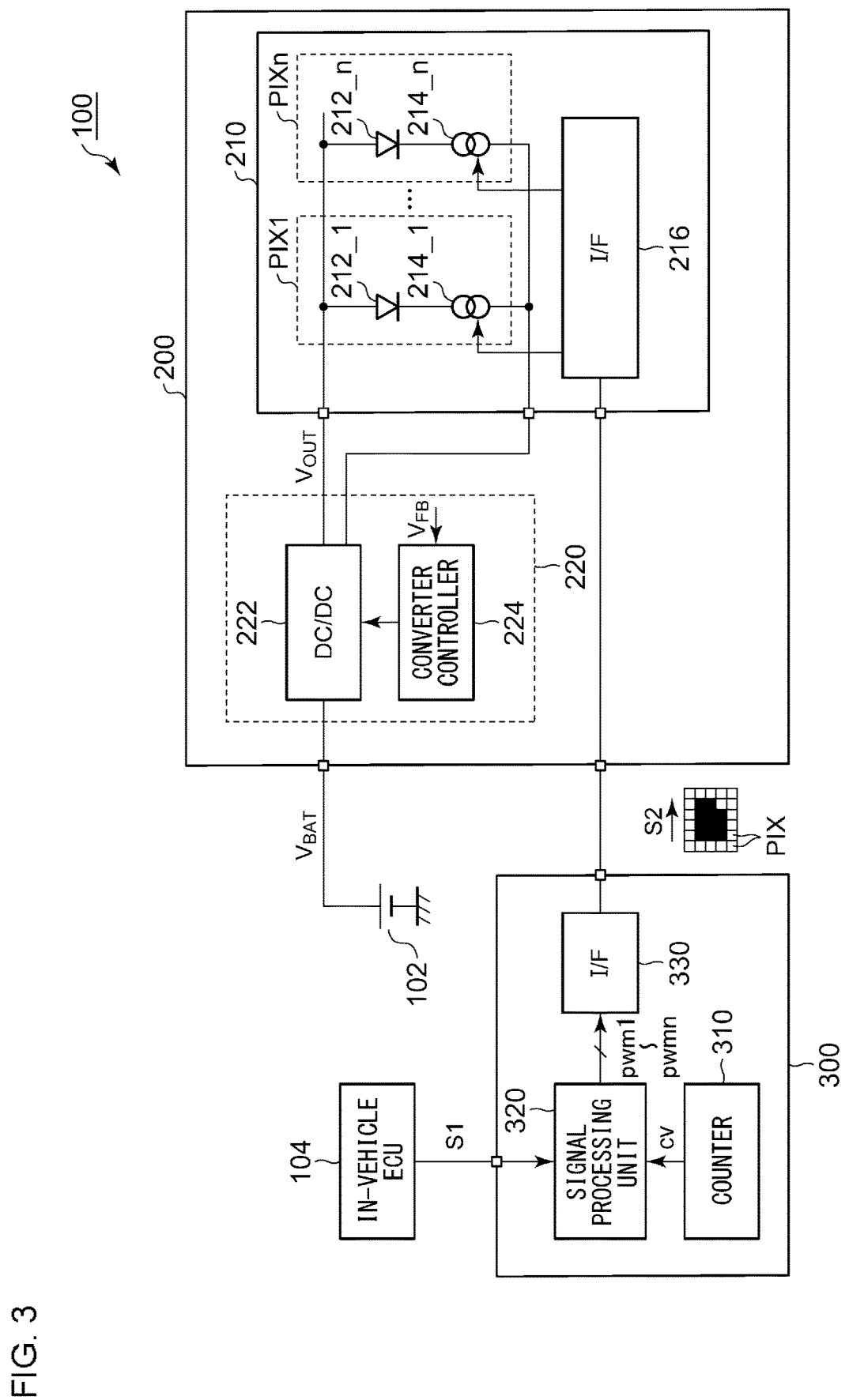
FIG. 3 is a block diagram showing a lamp system according to an embodiment.

FIG. 3 is a block diagram showing a lamp system 100 according to an embodiment.

The lamp system 100 includes a battery 102, an in-vehicle ECU (Electronic Control Unit) 104, a variable light distribution lamp 200, and a controller 300.

The variable light distribution lamp 200 includes an LED array device 210 and a power supply circuit 220. The LED array device 210 includes multiple (n) light-emitting pixels PIX1 through PIXn and an interface circuit 216 housed in a single package. The number n of the light-emitting pixels PIX is determined according to the resolution of the variable light distribution lamp 200. Specifically, n may be several hundred to several thousand.

The multiple light-emitting pixels PIX1 through PIXn each include a light-emitting element 212 and a current source 214. The multiple light-emitting elements 212_1 through 212_n are each configured as a semiconductor light-emitting element such as an LED, semiconductor laser (LD), organic EL element, or the like. The multiple light-emitting pixels PIX1 through PIXn are spatially arranged in in an array (in the form of a matrix).

The multiple current sources 214_1 through 214_n are coupled to the corresponding multiple light-emitting elements 212_1 through 212_n in series. The multiple current sources 214_1 through 214_n are each configured to be turned on and off independently. When the i-th current source 214_i is turned on, the corresponding light-emitting element 212_i emits light. In this stage, the corresponding light-emitting element PIXi becomes the lighting-on state.

The interface circuit 216 controls the on/off states of the current sources 214_1 through 214_n according to a control signal S2 from the controller 300. The interface circuit 216 and an interface circuit 330 described later may each be configured as a high-speed serial interface.

The power supply circuit 220 supplies electric power to the LED array device 210. The configuration of the power supply circuit 220 is not restricted in particular. The power supply circuit 220 may include a DC/DC converter 222 configured to step down a power supply voltage (battery voltage) VBAT from the battery 102 and a converter controller 224. The converter controller 224 controls the DC/DC converter 222 such that electric power that allows the light-emitting elements 212_1 through 212_n to turn on is supplied to the LED array device 210.

The converter controller 224 may employ the lowest voltage from among the voltages (cathode voltages of the light-emitting elements 212) at all the connection nodes each of which couples the corresponding light-emitting element 212 and the corresponding current source 214 as a feedback signal $V_{FB}$. Also, the converter controller 224 may control the DC/DC converter 222 such that the feedback signal $V_{FB}$ approaches a target value $V_{REF}$.

Alternatively, the converter controller 224 may employ the output voltage $V_{OUT}$ of the power supply circuit 220 as the feedback signal $V_{FB}$. Also, the converter controller 224 may control the DC/DC converter 222 such that the feedback signal $V_{FB}$ approaches a target value $V_{REF}$.

The controller 300 receives a light distribution instruction S1 from the in-vehicle ECU 104, generates a control signal S2 that corresponds to the light distribution instruction S1, and transmits the control signal S2 to the interface circuit 216 of the LED array device 210. The controller 300 may be built into a housing of a headlamp provided with the variable light distribution lamp 200. Also, the controller 300 may be arranged as a component external to the housing. The variable light distribution lamp 200 is a heat generator. Accordingly, an arrangement in which the controller is arranged in the vehicle interior is advantageous from a thermal design viewpoint.

Specifically, the controller 300 PWM-controls the multiple light-emitting pixels PIX1 through PIXn so as to control light distribution. A PWM frequency of several hundred Hz (e.g., 100 to 400 Hz) is employed, for example. Accordingly, the PWM period is set to several milliseconds to several dozen milliseconds (ms).

The controller 300 includes a common counter 310, a signal processing unit 320, and an interface circuit 330. The common counter 310 is provided as a common counter for the multiple light-emitting pixels PIX1 through PIXn, and generates a common count value cv configured as a ramp-wave signal having a PWM period Tp. For example, in a case in which the number of gradations m is 256, the common counter 310 can be configured as an 8-bit counter. The common count value cv may be a ramp-up signal that counts up from 0 to 255 and returns to 0 after it reaches 255. Alternatively, the common count value cv may be a ramp-down signal that counts down from 255 to 0 and returns to 255 after it reaches 0.

The signal processing unit 320 generates multiple duty cycle instruction values dc1 through dcn for specifying the duty cycle for each of the multiple light-emitting pixels PIX1 through PIXn according to the light distribution instruction S1 from the in-vehicle ECU 104. The duty cycle instruction values dc1 through dcn each have the same number of bits (8 bits) as that of the common count value cv. When the duty cycle instruction value is set to the maximum value (255), the duty cycle is set to 100%. When the duty cycle instruction value is set to the minimum value (0), the duty cycle is set to 0%.

The signal processing unit 320 stores the multiple offset values ofs1 through ofsn (which will be collectively referred to as "phase control data" hereafter) corresponding to the multiple light-emitting pixels PIX1 through PIXn. The signal processing unit 320 adds a corresponding offset value ofsi to the common count value cv of the common counter 310 for each of the light-emitting pixels PIXi (i=1 to n), so as to generate an individual count value cvi. The number of bits of each individual count value cvi is the same as that of the common count value cv (8 bits). In a case in which cvi exceeds the maximum value max (255), the value is processed such as (cvi-max). The signal processing unit 320 compares each individual count value cvi with the corresponding duty cycle instruction dci, and generates an individual PWM signal pwmi having a level (1/0) that corresponds to the comparison result.

The interface circuit 330 transmits the control signal S2 including information on the multiple individual PWM signals pwm1 through pwmn to the interface circuit 216.

The format or signal format of the control signal S2 is not restricted in particular. For example, the control signal S2 may be transmitted as image data.

With the PWM period as Tp, and with the number of gradations as m, the controller 300 may transmit the control signal S2 configured as image data for every control period Tc (=Tp/m), so as to update the state of each of the light-emitting pixels PIX1 through PIXn.

Figure 4A:
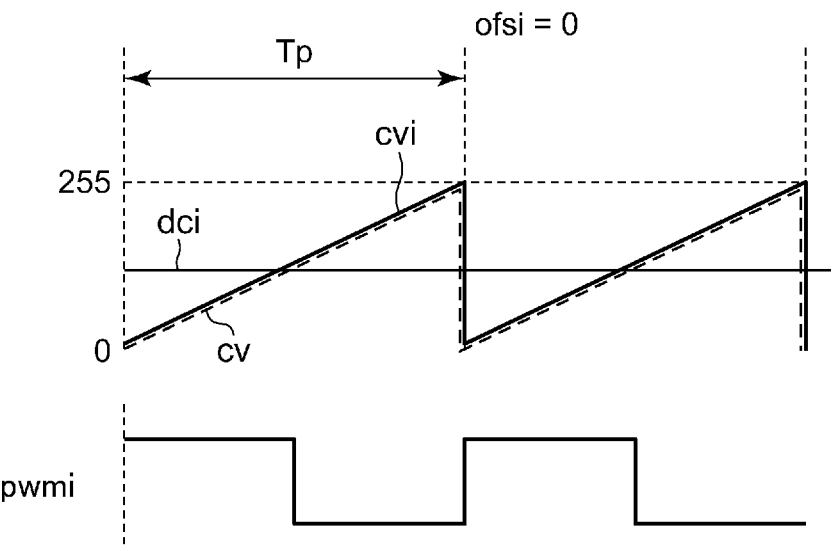
FIGS. 4A and 4B are diagrams for explaining the operation of the i-th light-emitting pixel supported by a controller.
Figure 4B:
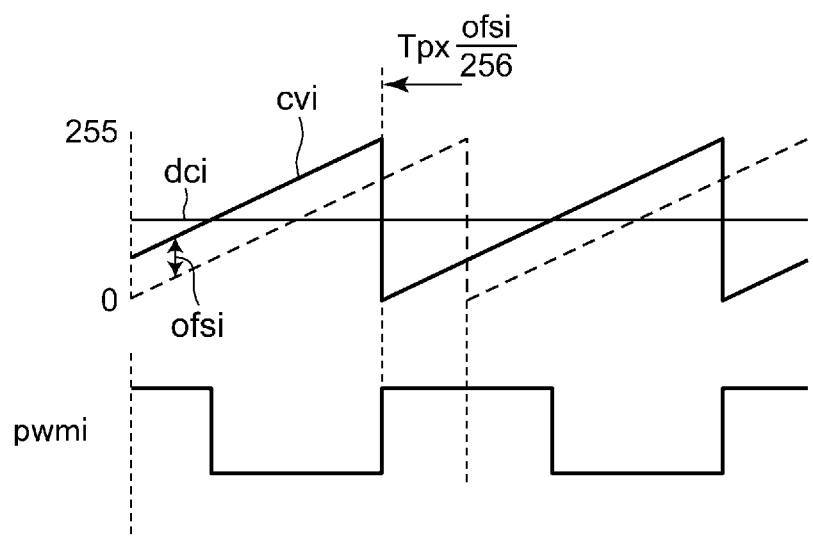

The above is the configuration of the lamp system 100. Next, description will be made regarding the operation thereof. FIGS. 4A and 4B are diagrams for explaining the operation of the controller 300 for controlling the i-th light-emitting pixel. FIG. 4A shows a case in which the offset value ofsi is zero. In this case, the individual count value cvi matches the common count value cv. Accordingly, the individual PWM signal pwmi transits to the on level at the start of the PWM period Tp.

FIG. 4B shows a case in which the offset value ofsi is non-zero. In this case, the phase of the individual count value cvi advances by (ofsi/256)×Tp as compared with the phase of the common count value cv. The individual count value cvi having a phase thus shifted is compared with the duty cycle instruction value dci so as to generate the individual PWM signal pwmi having a shifted phase with the same duty cycle as in a case in which the offset value ofsi is set to zero.

It should be noted that, in a case in which the offset value ofsi is a negative value (or in a case in which decrementing is executed with a positive offset value), this allows the phase to be delayed.

Figure 5:
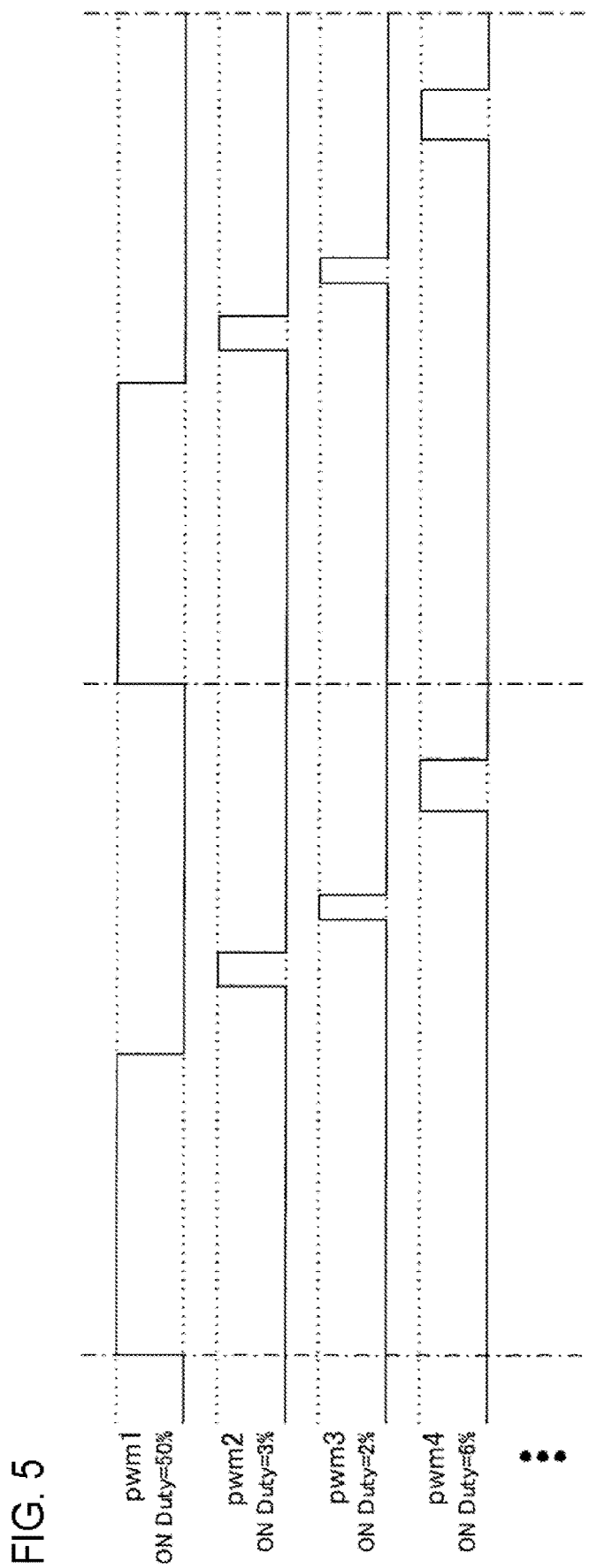
FIG. 5 is a diagram showing an example of the operation of a lamp system according to an embodiment.

FIG. 5 is a diagram showing an example of the operation of the lamp system 100 according to the embodiment. An appropriate phase shift is applied based on the duty cycle (on duty) of each pixel. This allows the number of light-emitting pixels PIX that turn on at the same time to be reduced. With this, the peak value of the output current $I_{OUT}$ of the power supply circuit 220 can be suppressed. This allows the power supply circuit 220 to have a reduced current supply capacity. Alternatively, this allows the power supply circuit 220 to be designed to have low response characteristics (load regulation) with respect to load fluctuations. This can facilitate the design of the power supply circuit 220. Also, this can provide advantages of allowing the power supply circuit 220 to be provided with a reduced cost, a compact size, etc.

Figure 6A:
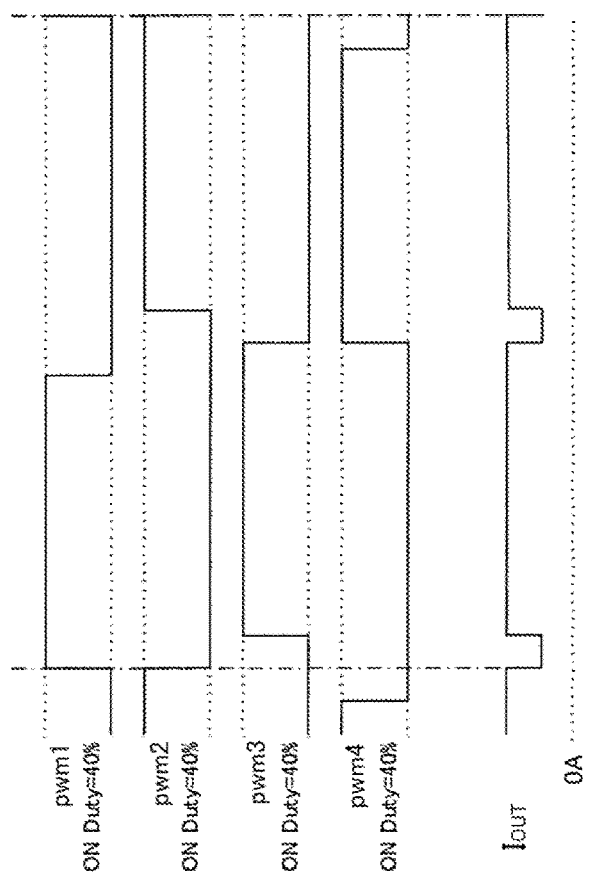
FIGS. 6A and 6B are diagrams for explaining a design method for phase control data corresponding to a light distribution.
Figure 6B:
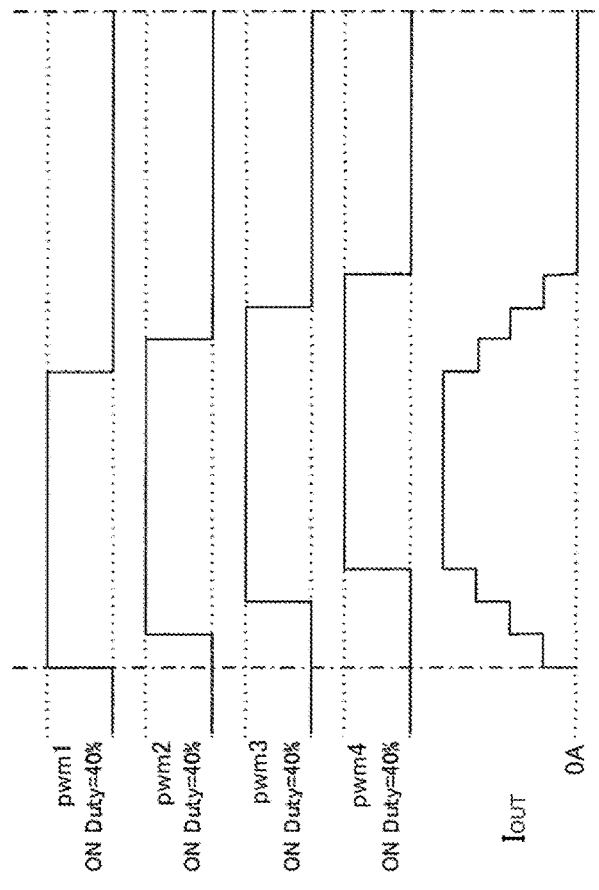

FIGS. 6A and 6B are diagrams for explaining the design method for phase control data corresponding to the light distribution. For ease of understanding and simplification of explanation, description will be made in which n=4, and the duty cycles of all the pixels are set to the same value, i.e., 40%. FIG. 6A shows the operation of a first design example. FIG. 6B shows the operation of a second design example.

In the light distribution in this example, the second design example is capable of suppressing the peak of the output current $I_{OUT}$ more than the first design example. That is to say, the offset values may preferably be designed such that the number of light-emitting pixels that turn on at the same time is reduced.

The phase shift amount to be applied to each pixel, i.e., the offset values ofs1 through ofsn, may be dynamically calculated according to the light distribution pattern such that the peak current is reduced.

Figure 7:
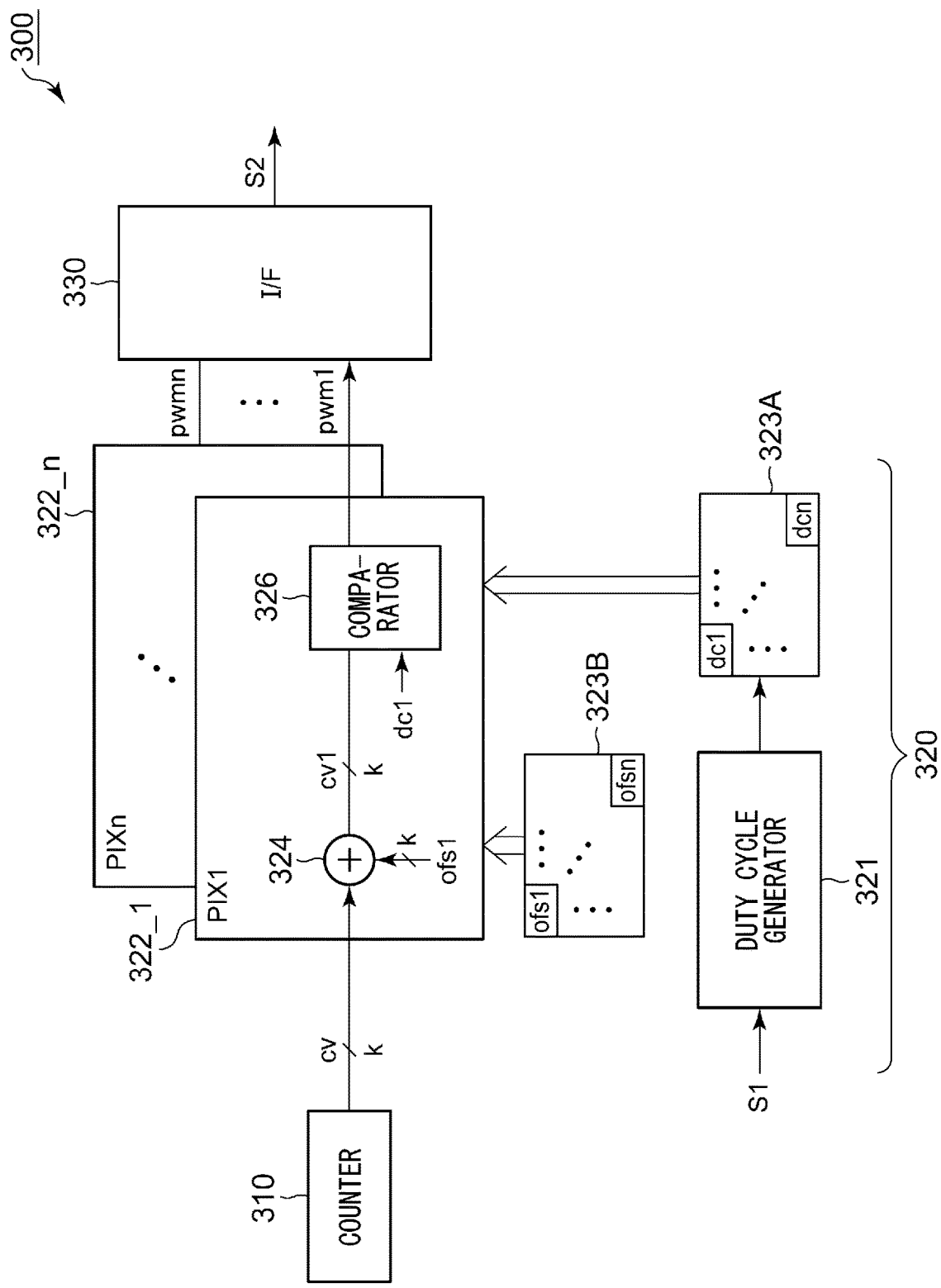
FIG. 7 is a block diagram showing an example configuration of a controller.

Next, description will be made regarding an example configuration of the signal processing unit 320. FIG. 7 is a block diagram showing an example configuration of the controller 300. The signal processing unit 320 includes a duty cycle generating unit 321, memory 323A, memory 323B, and n circuit blocks 322 that correspond to n light-emitting pixels PIX1 through PIXn.

The duty cycle generating unit 321 generates multiple duty cycle instruction values dc1 through dcn for specifying the duty cycles of the multiple light-emitting pixels based on the light distribution instruction S1, and stores the duty cycle instruction values dc1 through dcn in the memory 323A.

The memory 323B is configured as a table that stores the offset values ofs1 through ofsn for the multiple light-emitting pixels, i.e., the phase control data.

The circuit block 322_i for each pixel includes an adder 324 and a comparator 326. The adder 324 adds the offset value ofsi to the common count value cv so as to generate the individual offset value cvi. The comparator 326 compares the individual offset value cvi with the duty cycle instruction value dci so as to output the individual PWM signal pwmi. From another viewpoint, the signal processing unit 320 includes n adders 324 and n comparators 326. The offset values ofs1 through ofsn of the respective channels to be loaded are held by nonvolatile memory (not shown).

The signal processing unit 320 may be configured as a hardware component. For example, the signal processing unit 320 may be configured as a programmable logic (PL) unit or an integrated circuit (IC). Alternatively, the duty cycle generating unit 321 portion may be provided as a processor that executes software, and the circuit blocks 322_1 through 322_n may each be configured as a hardware component.

Alternatively, the entire signal processing unit 320 may be provided as a combination of a software program and a processor that is capable of executing the software program.

With the automotive lamp, in many cases, several patterns of the light distribution to be used are determined beforehand. Accordingly, the phase control data may be prepared such that it includes multiple offset values for each light distribution (i.e., for each combination of the duty cycles for the respective pixels). Also, the phase control data to be used may be switched according to the light distribution.

Figure 8:
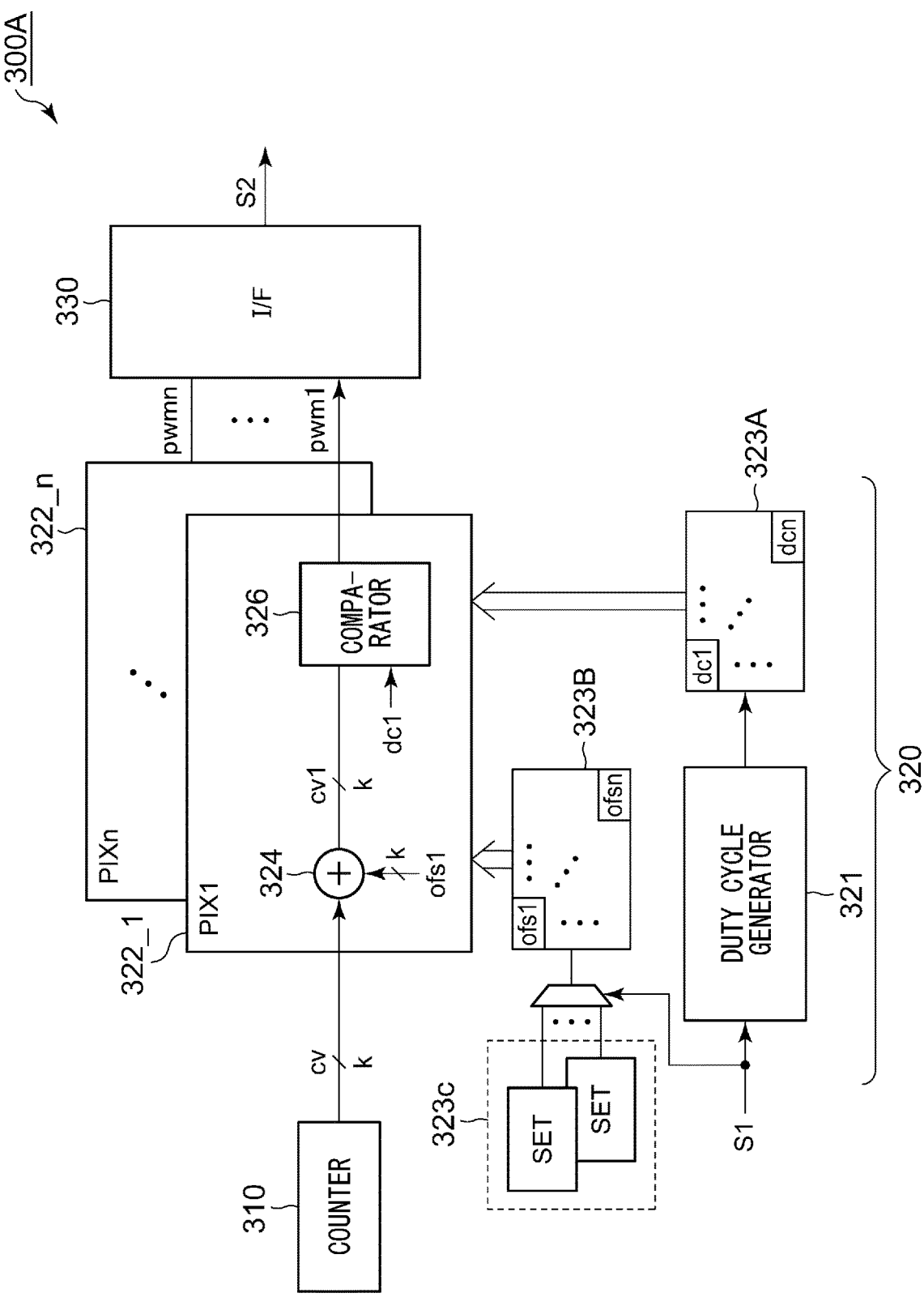
FIG. 8 is a block diagram showing a controller that is capable of switching the phase control data.

FIG. 8 is a block diagram showing a controller 300A that is capable of switching the phase control data.

The controller 300A is provided with memory 323C that stores multiple items of phase control data. A selector 325 selects one item of phase control data from the memory 323C corresponding to the light distribution instruction S1, and loads the phase control data thus selected in the memory 323B. Alternatively, the memory 323B may be omitted. In this case, the circuit blocks 322_1 through 322_n may each be configured to be capable of directly referencing the memory 323C.

Next, description will be made regarding a specific example of the phase control of the multiple light-emitting pixels PIX for each light distribution.

High Beam

Figure 9:
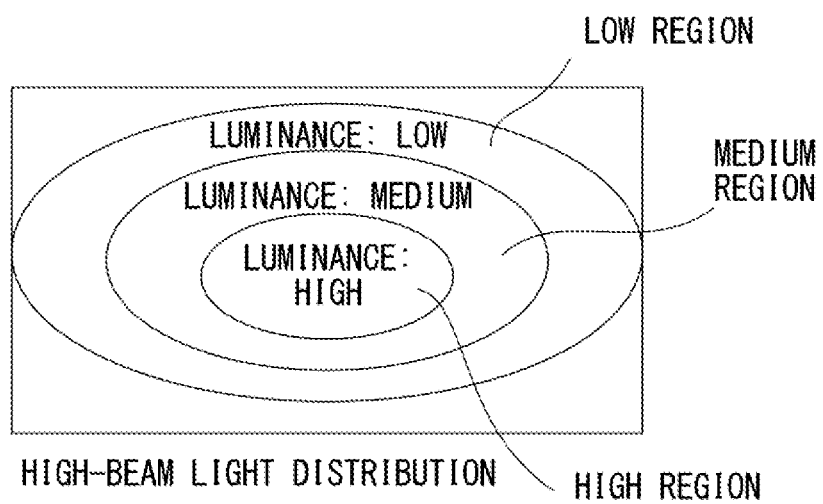
FIG. 9 is a diagram showing an example of the light distribution of a high beam.

FIG. 9 is a diagram showing an example of high-beam light distribution. The high-beam light distribution is configured such that it is brightest in its center portion, and darkens toward its outer region. That is to say, a large duty cycle is applied to each light-emitting pixel in the center region. On the other hand, a smaller duty cycle is applied to each light-emitting pixel in the outer region.

In a case in which the multiple light-emitting pixels are divided into ranks based on the luminance to be provided, one of the multiple items of phase control data may be determined such that the phases of the multiple individual PWM signals for the multiple light-emitting pixels included in the same rank are dispersed in the PWM period, i.e., such that there is no concentration of the light-emitting periods of light-emitting pixels that provide the same luminance. This provides further smoothed current.

In the example shown in FIG. 9, three luminance ranks are defined. Accordingly, the light-emitting pixels are divided into three reigns, i.e., a Hi region in the center-most region, a Lo region in the outer-most region, and a Mid region as the other region. In this case, the phase control data is determined such that the phases of k individual PWM signals for the k (k<n) multiple light-emitting pixels included in the Hi region from among the n light-emitting pixels are dispersed in the PWM period. Similarly, the phase control data is determined such that the phases of l individual PWM signals for the l (l<n) multiple light-emitting pixels included in the Lo region from among the n light-emitting pixels are dispersed in the PWM period. Furthermore, the phase control data is determined such that the phases of m individual PWM signals for the m (m<n) multiple light-emitting pixels included in the Mid region defined such that it is interposed between the Hi region and the Lo region are dispersed in the PWM period.

FIG. 10A is a diagram showing an example of the phase control data that corresponds to the light distribution shown in FIG. 9. FIG. 10B shows a comparison example in a case in which the light distribution shown in FIG. 9 is provided by control based on different phase control data. In a case in which the light-emitting pixels included in the same luminance rank, i.e., in the same region, have phases that are close to each other as shown in FIG. 10B (in a case in which the offset values are close to each other), the peak power (peak current) becomes larger.

In contrast, with an arrangement as shown in FIG. 10B in which the phases of the light-emitting pixels included in the same luminance rank, i.e., in the same region, are dispersed, such an arrangement is capable of suppressing the peak power (peak current).

Description has been made in this example regarding an arrangement in which the light-emitting pixels are divided into three ranks (regions). Also, the light-emitting pixels may be divided into two ranks (regions). Alternatively, the light-emitting pixels may be divided into four or more ranks (regions).

Low Beam

Figure 11:
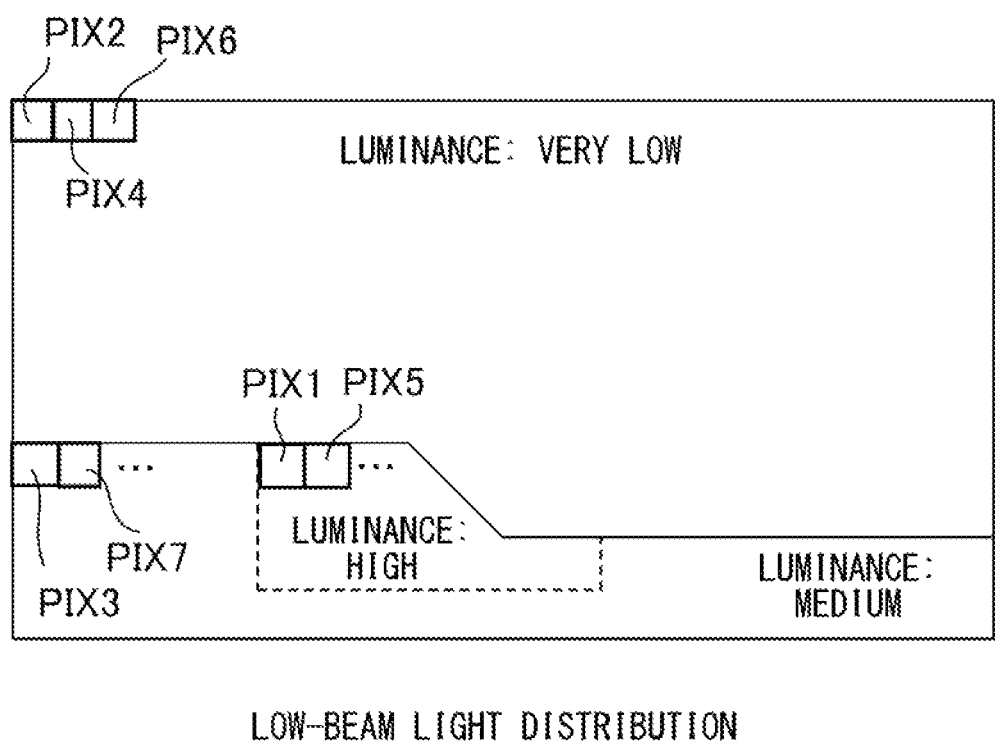
FIG. 11 is a diagram showing an example of the light distribution of a low beam.

FIG. 11 is a diagram showing an example of the light distribution of a low beam. The low-beam light distribution includes a first region defined on the lower side of a cutoff line and a second region defined on the upper side of the cutoff line. In particular, the center of the first region is designed to provide a particularly high luminance. The second region is designed to provide a very low luminance for overhead signs.

In a case in which the n multiple light-emitting pixels are divided into ranks according to the luminance, the phase control data to be used for generating such a light distribution may be determined such that the phases of the individual PWM signals to be applied to the light-emitting pixels included in the multiple ranks are changed in a cyclic manner.

FIG. 12 is a diagram showing an example of the phase control data that corresponds to the light distribution shown in FIG. 11. The phase control data is determined such that the phases of the individual PWM signals to be applied to the light-emitting pixels included in the first region (high luminance, medium luminance) and the second region (very low luminance) are changed in a cyclic manner. FIG. 11 shows an example in which PIX1, PIX3, PIX5, PIX7, . . . are included in the first region (high luminance, medium luminance), and PIX2, PIX4, PIX6, . . . are included in the second region (very low luminance).

The overall area of the first region is divided into two regions (high and medium). The individual PWM signals to be applied to the light-emitting pixels included in the first region may be determined such that the phases thereof are changed in a cyclic manner.

Uniform Light Distribution

In a case in which the light distribution is designed so as to provide uniform luminance over all the pixels, the multiple individual PWM signals may be determined such that they have a uniform phase, i.e., such that the offset values ofs1 through ofsn are an arithmetic progression.

Light Distribution for Image Capturing

In some cases, the variable light distribution lamp forms an active sensor together with an image sensor. In this case, in a case in which the multiple light-emitting pixels emit light at random timings, this involves the formation of an artifact pattern on the image sensor. In order to solve such a problem, the phase control data is designed so as to align the phases of the multiple individual PWM signals, i.e., such that the offset values ofs1 through ofsn are substantially the same value. The phase control data thus designed may preferably be used in the image capturing cycle of the image sensor. This is capable of preventing the formation of an artifact pattern in the image captured by the image sensor.

The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Modification 1

Various modification may be made for the format of the control signal to be generated by the controller 300. For example, the controller 300 may transmit the control signal S2 that indicates the timings at which the individual PWM signal pwm1 through pwmn are to be switched for the respective channels to the variable light distribution lamp 200.

Modification 2

Alternatively, in a case in which the number n of the light-emitting pixels PIX is small, the interface circuit 216 and the interface circuit 330 may be coupled via n wiring lines. With this, n individual PWM signals PWM1 through PWMn may be transmitted using the n wiring lines.

Modification 3

Description has been made in the embodiment regarding an arrangement in which the controller 300 is provided with a single common counter. However, the present invention is not restricted to such an arrangement. Also, n multiple individual counters each of which is capable of controlling the phase may be provided. Furthermore, an arrangement may be made so as to allow the phase of each individual counter to be shifted according to an offset value ofs. With this, the count value of the individual counter may be compared with the duty cycle instruction value for each light-emitting pixel so as to generate the individual PWM signal.

Modification 4

The signal processing unit 320 may calculate the phase control data for determining a combination of the phases of the multiple individual PWM signals (i.e., offset values ofs1 through ofsn) in a real-time manner according to the light distribution.

The above-described embodiments show only an aspect of the mechanisms and applications of the present invention. Rather, various modifications and various changes in the layout can be made without departing from the spirit and scope of the present invention defined in appended claims.

What is claimed is:

1. A controller structured to pulse width modulation (PWM) control multiple light-emitting pixels in an array that form a variable light distribution lamp, the controller comprising:
   a common counter provided in common for the plurality of light-emitting pixels, and structured to generate a common count value having a ramp waveform; and
   a signal processing unit structured to generate a plurality of duty cycle instruction values for specifying duty cycles for the plurality of light-emitting pixels according to a light distribution instruction, to store a plurality of offset values that correspond to the plurality of light-emitting pixels, to generate an individual count value for each light-emitting pixel by adding a corresponding offset value to the common count value, and to generate an individual PWM signal according to a result of a comparison between the individual count value and the corresponding duty cycle instruction value, wherein the signal processing unit is structured to store a plurality of items of phase control data including the plurality of offset values, and to select one item that corresponds to the light distribution instruction from among the plurality of items of phase control data.

2. The controller according to claim 1, wherein the signal processing unit comprises a plurality of adders that correspond to the plurality of light-emitting pixels,
   and wherein each adder adds a corresponding offset value to the common count value so as to output the individual count value.

3. The controller according to claim 1, wherein the signal processing unit includes a processor that is capable of executing a software program,
   and wherein the controller is implemented in the software program and the processor.

4. The controller according to claim 1, wherein first data that is one item of the plurality of items of phase control data is determined such that, in a case in which the plurality of light-emitting pixels are divided into ranks according to luminance, the plurality of individual PWM signals that correspond to the plurality of light-emitting pixels included in the same rank have substantially dispersed phases.

5. The controller according to claim 1, wherein second data that is one item of the plurality of items of phase control data is determined such that the phases of k individual PWM signals that correspond to k multiple (k<n) light-emitting pixels included in a center region from among the n multiple light-emitting pixels are dispersed, and such that the phases of l individual PWM signals that correspond to l multiple (l<n) light-emitting pixels included in an outer-circumferential region from among the n multiple light-emitting pixels are dispersed.

6. The controller according to claim 1, wherein third data that is one item of the plurality of items of phase control data is determined such that the phases of k individual PWM signals that correspond to k multiple (k<n) light-emitting pixels included in a center-most region from among the n multiple light-emitting pixels are dispersed, such that the phases of l individual PWM signals that correspond to l multiple (l<n) light-emitting pixels included in an outer-most region from among the n multiple light-emitting pixels are dispersed, and such that the phases of m individual PWM signals that correspond to m multiple (m<n) light-emitting pixels included in a region interposed between the center-most region and the outer-most region are dispersed.

7. The controller according to claim 1, wherein fourth data that is one item of the plurality of items of phase control data is determined such that, in a case in which the plurality of n light-emitting pixels are divided into ranks according to luminance, the phases of the individual PWM signals that correspond to the light-emitting pixels included in the plurality of ranks are changed in a cyclic manner.

8. The controller according to claim 1, wherein fifth data that is one item of the plurality of items of phase control data is determined such that, in a case in which the plurality of light-emitting pixels are divided into a first region defined on a lower side of a cutoff line of a low beam and a second region defined on an upper side of the cutoff line, the phases of the individual PWM signals that correspond to the light-emitting pixels included in the first region and the second region are changed in a cyclic manner.

9. The controller according to claim 1, wherein sixth data that is one item of the plurality of items of phase control data is determined such that the plurality of individual PWM signals have equal phases.

10. The controller according to claim 9, wherein the variable light distribution lamp forms an active sensor together with an image sensor,
and wherein the sixth data is selected in an image capture cycle of the image sensor.

11. The controller according to claim 1, wherein seventh data that is one item of the plurality of items of phase control data is determined such that the phases of the plurality of individual PWM signals that correspond to the plurality of light-emitting pixels are an arithmetic progression.

12. A lamp system comprising:
a light-emitting device comprising a plurality of light-emitting pixels; and
the controller according to claim 1, structured to PWM-control the plurality of light-emitting pixels.

13. A controller structured to pulse width modulation (PWM) control multiple light-emitting pixels in an array that form a variable light distribution lamp, the controller comprising a signal processing unit structured to generate a plurality of individual PWM signals that correspond to the plurality of light-emitting pixels according to a light distribution instruction,
wherein the signal processing unit is structured to change a combination of the phases of the plurality of individual PWM signals adaptively according to a light distribution, wherein the signal processing unit stores a plurality of items of phase control data each determining a combination of the phases of the plurality of individual PWM signals,
and wherein the signal processing unit selects one from among the plurality of items of phase control data according to the light distribution instruction.

14. The controller according to claim 13, wherein first data that is one item of the plurality of items of phase control data is determined such that, in a case in which the plurality of light-emitting pixels are divided into ranks according to luminance, the plurality of individual PWM signals that correspond to the plurality of light-emitting pixels included in the same rank have substantially dispersed phases.

15. The controller according to claim 13, wherein second data that is one item of the plurality of items of phase control data is determined such that the phases of k individual PWM signals that correspond to k multiple (k<n) light-emitting pixels included in a center region from among the n multiple light-emitting pixels are dispersed, and such that the phases of l individual PWM signals that correspond to l multiple (l<n) light-emitting pixels included in an outer-circumferential region from among the n multiple light-emitting pixels are dispersed.

16. The controller according to claim 13, wherein third data that is one item of the plurality of items of phase control data is determined such that the phases of k individual PWM signals that correspond to k multiple (k<n) light-emitting pixels included in a center-most region from among the n multiple light-emitting pixels are dispersed, such that the phases of l individual PWM signals that correspond to l multiple (l<n) light-emitting pixels included in an outer-most region from among the n multiple light-emitting pixels are dispersed, and such that the phases of m individual PWM signals that correspond to m multiple (m<n) light-emitting pixels included in a region interposed between the center-most region and the outer-most region are dispersed.

17. The controller according to claim 13, wherein fourth data that is one item of the plurality of items of phase control data is determined such that, in a case in which the plurality of n light-emitting pixels are divided into ranks according to luminance, the phases of the individual PWM signals that correspond to the light-emitting pixels included in the plurality of ranks are changed in a cyclic manner.

18. The controller according to claim 13, wherein fifth data that is one item of the plurality of items of phase control data is determined such that, in a case in which the plurality of light-emitting pixels are divided into a first region defined on a lower side of a cutoff line of a low beam and a second region defined on an upper side of the cutoff line, the phases of the individual PWM signals that correspond to the light-emitting pixels included in the first region and the second region are changed in a cyclic manner.

19. The controller according to claim 13, wherein sixth data that is one item of the plurality of items of phase control data is determined such that the plurality of individual PWM signals have equal phases.

20. The controller according to claim 19, wherein the variable light distribution lamp forms an active sensor together with an image sensor,
and wherein the sixth data is selected in an image capture cycle of the image sensor.

21. The controller according to claim 13, wherein seventh data that is one item of the plurality of items of phase control data is determined such that the phases of the plurality of individual PWM signals that correspond to the plurality of light-emitting pixels are an arithmetic progression.

22. The controller according to claim 13, wherein the signal processing unit is structured to calculate a combination of the phases of the plurality of individual PWM signals in a real-time manner according to the light distribution.

23. A lamp system comprising:
a light-emitting device comprising a plurality of light-emitting pixels; and
the controller according to claim 13, structured to PWM-control the plurality of light-emitting pixels.

* * * * *